(12) United States Patent
Aoyama

(10) Patent No.: US 7,095,589 B2
(45) Date of Patent: Aug. 22, 2006

(54) MAGNETIC RECORDING MEDIUM AND MAGNETIC RECORDING AND REPRODUCING SYSTEM

(75) Inventor: Tsutomu Aoyama, Tokyo (JP)

(73) Assignee: TDK Corporation, Tokyo (JP)

( * ) Notice: Subject to any disclaimer, the term of this patent is extended or adjusted under 35 U.S.C. 154(b) by 356 days.

(21) Appl. No.: 10/715,351

(22) Filed: Nov. 19, 2003

(65) Prior Publication Data

US 2005/0036224 A1     Feb. 17, 2005

(30) Foreign Application Priority Data

Nov. 20, 2002   (JP)   ............................. 2002-335981

(51) Int. Cl.
    *G11B 5/82*   (2006.01)
(52) U.S. Cl. ..................................... 360/135
(58) Field of Classification Search ................ 360/135
    See application file for complete search history.

(56) References Cited

U.S. PATENT DOCUMENTS

| 3,947,889 | A | * | 3/1976 | Lazzari ........................ 360/315 |
| 4,423,450 | A | * | 12/1983 | Hamilton ..................... 360/111 |
| 6,347,016 | B1 | * | 2/2002 | Ishida et al. ................. 360/17 |
| 6,781,779 | B1 | * | 8/2004 | Arita et al. .................... 360/59 |
| 6,903,905 | B1 | * | 6/2005 | Tanaka .................. 360/324.12 |
| 6,961,196 | B1 | * | 11/2005 | Ishida et al. .................. 360/16 |
| 2005/0117247 | A1 | * | 6/2005 | Aoyagi ..................... 360/97.01 |
| 2005/0276999 | A1 | * | 12/2005 | Kuse et al. ................. 428/836 |

FOREIGN PATENT DOCUMENTS

| JP | 10-97940 | 4/1998 |
| JP | 11-16147 | 1/1999 |

* cited by examiner

*Primary Examiner*—Allen Cao
(74) *Attorney, Agent, or Firm*—Oblon, Spivak, McClelland, Maier & Neustadt, P.C.

(57) ABSTRACT

A disc-shaped magnetic recording medium has magnetic tracks that are arranged thereon substantially concentrically for writing and reading magnetic information. Assuming that a saturation magnetic field in a width direction extending in a radial direction from the center of the disc-shaped magnetic recording medium is $H_R$, and a saturation magnetic field in a circumferential direction perpendicular to the radial direction is $H_C$, $H_R/H_C$ is set to a value within a range of 0.5 to 0.95 in each of the magnetic tracks, and magnetization information is recorded in the width direction of each magnetic track. In gap portions between the magnetic tracks located adjacent to each other in the radial direction, discrete portions for magnetically separating the adjacent magnetic tracks are formed, respectively. With this configuration, it is possible to realize recording and reproduction in the magnetic track width direction.

20 Claims, 4 Drawing Sheets

MAGNETIC RECORDING MEDIUM AND MAGNETIC RECORDING AND REPRODUCING SYSTEM

BACKGROUND OF THE INVENTION

1. Field of the Invention

The present invention relates to a new magnetic recording medium having magnetic tracks arranged substantially concentrically for writing and reading magnetic information, and discrete portions for magnetically separating the magnetic tracks located adjacent to each other in a radial direction, to thereby record magnetization information in a width direction of each magnetic track, and further relates to a new magnetic recording and reproducing system employing such a magnetic recording medium.

2. Description of the Related Art

For the purpose of reducing influence between the adjacent magnetic tracks to thereby realize a high track density, there have been proposed so-called discrete track mediums that are provided with magnetically separating layers (discrete portions) at gap portions between the adjacent magnetic tracks. Presently, the proposed discrete track mediums are roughly classified into two types depending on a direction of recorded magnetization information, i.e. the discrete track medium of the in-plane longitudinal recording type where the magnetization information is recorded in an in-plane longitudinal direction along a circumferential direction of the medium, and the discrete track medium of the perpendicular recording type where the magnetization information is recorded in a thickness direction of a recording layer.

In case of the discrete track medium of the in-plane longitudinal recording type, following improvement in linear recording density, it is necessary to enhance a coercivity ($H_C$) of the medium for preventing demagnetization caused by a demagnetization field, and there arises a tendency that recording by a magnetic head becomes difficult in the medium having a high coercivity.

On the other hand, in case of the discrete track medium of the perpendicular recording type, it is necessary to achieve a sharp recording magnetic field for realizing a high recording density. For this purpose, it is necessary to provide a thick high magnetic permeability layer under the medium recording layer, and therefore, there arise problems of increase in manufacturing cost of the medium and occurrence of noise due to movement of magnetic domain walls in the thick high magnetic permeability layer.

As one means for solving such problems, a method of recording (in-plane width direction recording or transverse magnetic recording) in a width direction of each magnetic track can be considered as one interesting technique.

However, with respect to such a recording technique in the magnetic track width direction, realization of recording and reproduction is practically quite difficult, and therefore, there have been no specific proposals about structures of a recording medium and a recording and reproducing system.

The present invention has been made under these circumstances, and has an object to provide a new magnetic recording medium that enables realization of the recording and reproduction in the magnetic track width direction, and further provide a new recording and reproducing system.

Owing to such a new magnetic recording medium and such a new recording and reproducing system, there are achieved various merits derived from the recording and reproduction in the magnetic track width direction, such as (1) while being of the in-plane recording type, the medium causes no self-demagnetization even in high linear recording density, and therefore, it is not necessary to greatly enhance a coercivity of the medium, so that designing of a recording head is facilitated, (2) there are no demagnetization fields between recording bits, and therefore, a thickness of a magnetic layer of the medium can be increased as compared with the conventional longitudinal direction recording, so that it is possible to improve a problem of loss of magnetization information caused by thermal fluctuation, (3) a gap length of a magnetic head is about a magnetic track width of the medium, so that designing of the magnetic head is facilitated, and (4) owing to the discrete track structure, higher track densification is made possible.

SUMMARY OF THE INVENTION

For accomplishing the foregoing object, according to one aspect of the present invention, there is obtained a disc-shaped magnetic recording medium on which magnetic tracks for writing and reading magnetic information are arranged substantially concentrically, wherein, assuming that a saturation magnetic field in a width direction extending in a radial direction from the center of the disc-shaped magnetic recording medium is $H_R$, and a saturation magnetic field in a circumferential direction perpendicular to the radial direction is $H_C$, $H_R/H_C$ is set to a value within a range of 0.5 to 0.95 in each of the magnetic tracks, and magnetization information is recorded in the width direction of each magnetic track, and wherein, in gap portions between the magnetic tracks located adjacent to each other in the radial direction, discrete portions for magnetically separating the adjacent magnetic tracks are formed, respectively.

As a preferred mode of the present invention, it is configured that a relationship between a track pitch ($T_P$) of each magnetic track and a width ($T_W$) thereof satisfies $0.8 \geq (T_W/T_P) \geq 0.4$.

According to another aspect of the present invention, there is obtained a magnetic recording and reproducing system comprising a magnetic recording medium, and a magnetic head for writing or reading information relative to the magnetic recording medium, wherein the magnetic recording medium is a disc-shaped magnetic recording medium on which magnetic tracks for writing and reading magnetic information are arranged substantially concentrically, wherein, assuming that a saturation magnetic field in a width direction extending in a radial direction from the center of the disc-shaped magnetic recording medium is $H_R$, and a saturation magnetic field in a circumferential direction perpendicular to the radial direction is $H_C$, $H_R/H_C$ is set to a value within a range of 0.5 to 0.95 in each of the magnetic tracks, and magnetization information is recorded in the width direction of each magnetic track, wherein, in gap portions between the magnetic tracks located adjacent to each other in the radial direction, discrete portions for magnetically separating the adjacent magnetic tracks are formed, respectively, wherein the magnetic head comprises a recording head portion having a recording gap for recording the magnetization information in the width direction of the magnetic track, and a reproducing head portion having a reproducing gap for taking in the magnetization information recorded in the width direction of the magnetic track, wherein a relationship between a length (G1) of the recording gap of the magnetic head and a track width ($T_W$) of the magnetic recording medium satisfies $1.5 \geq (G1/T_W) \geq 0.9$, and wherein a relationship between a length (G2) of the reproducing gap of the magnetic head and the track width ($T_W$) of the magnetic recording medium satisfies $1.2 \geq (G2/T_W) \geq 0.75$.

DETAILED DESCRIPTION OF THE INVENTION

Now, a preferred embodiment of the present invention will be described hereinbelow with reference to the drawings.

Figure 1:
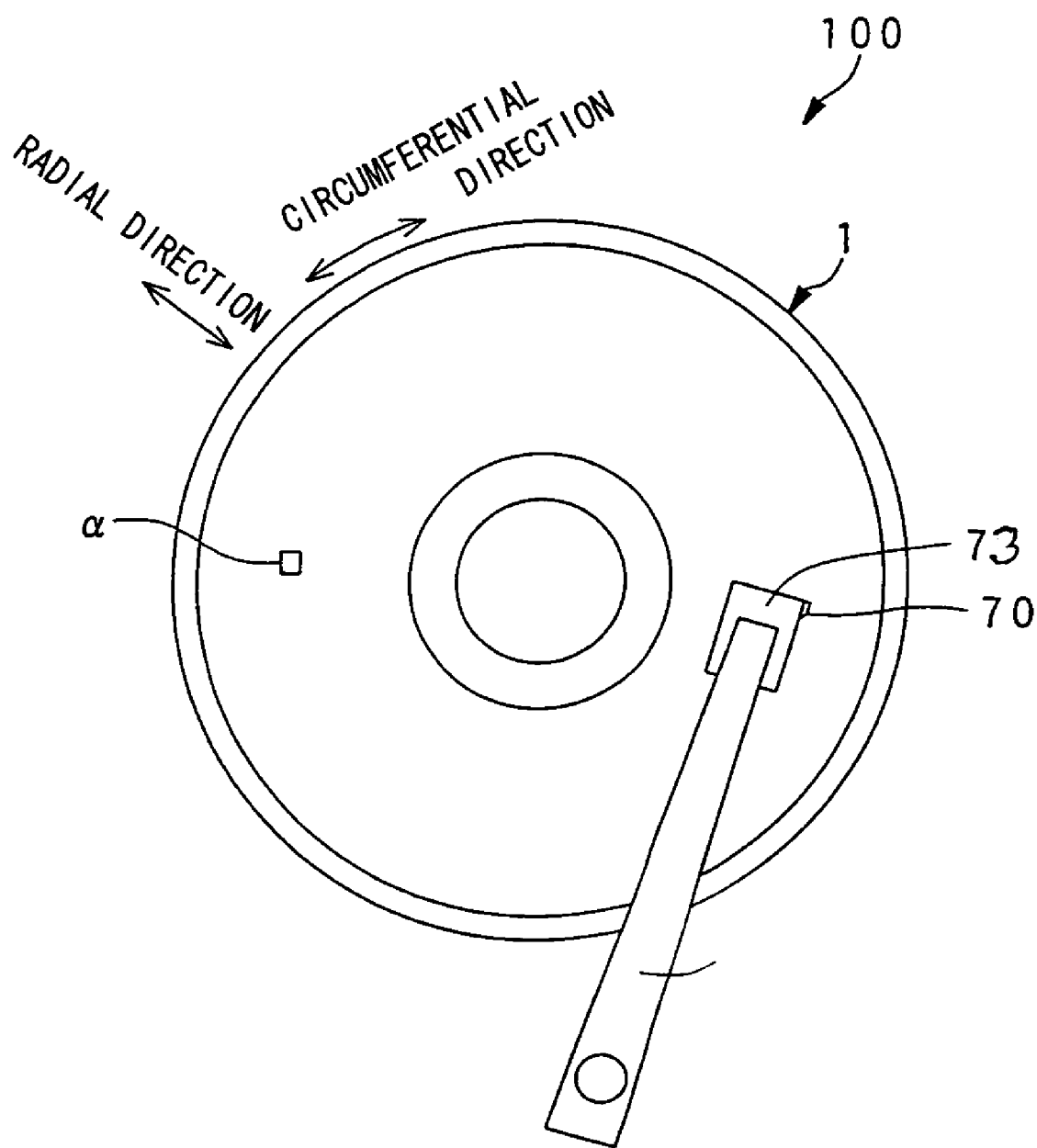
FIG. 1 is a schematic plan view showing an overall configuration of a magnetic recording and reproducing system formed by the combination of a disc-shaped magnetic recording medium according to the present invention and a recording and reproducing device including a magnetic head.
Figure 2:
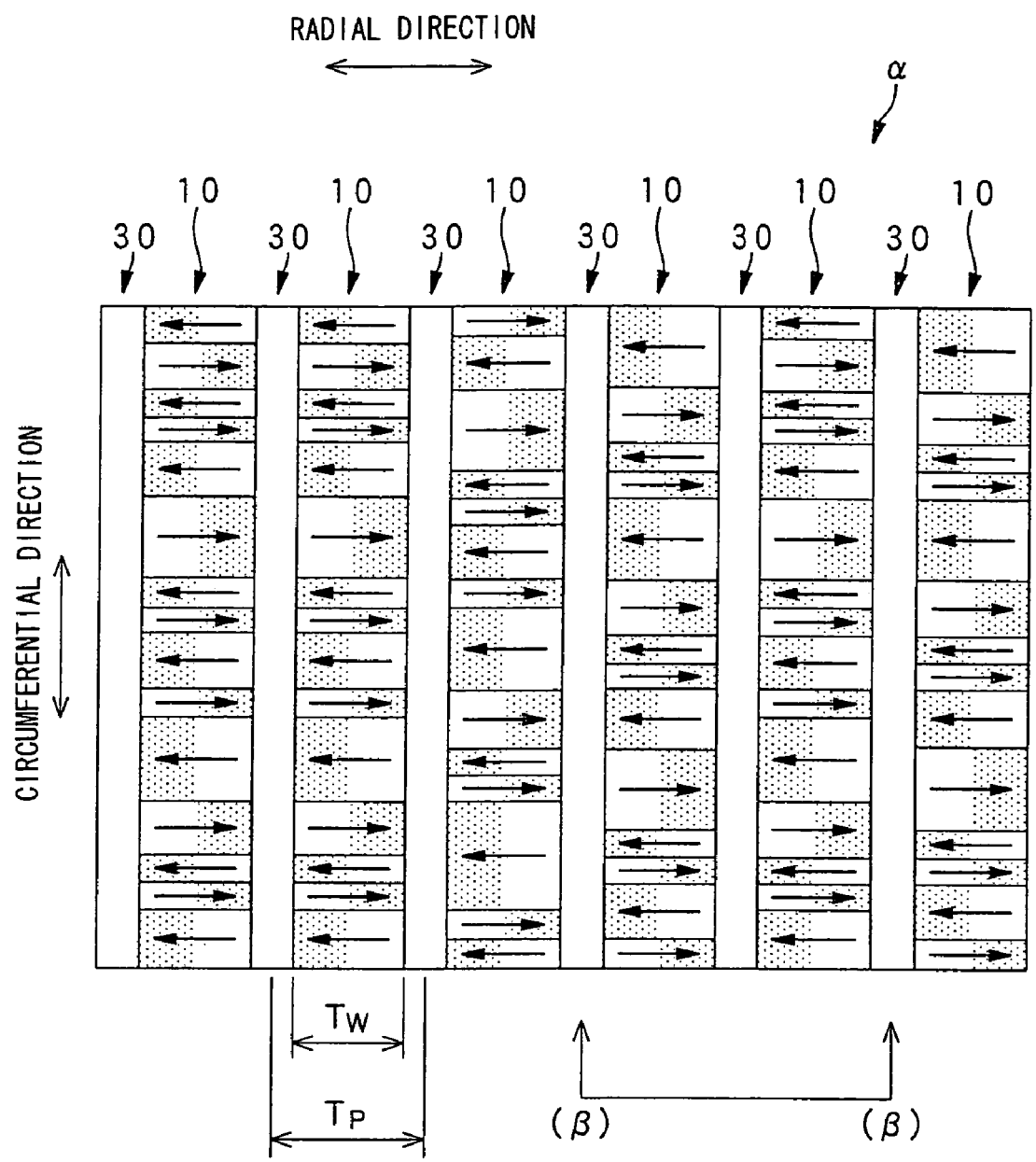
FIG. 2 is an enlarged schematic view exemplarily showing a microscopic portion a, surrounded by a square in FIG. 1, of the magnetic recording medium.

FIG. 1 is a schematic plan view showing an overall configuration of a magnetic recording and reproducing system 100 formed by the combination of a disc-shaped magnetic recording medium 1 according to the present invention and a recording and reproducing device including a magnetic head 70. FIG. 2 is an enlarged schematic view of a microscopic portion a, surrounded by a square in FIG. 1, of the magnetic recording medium 1, wherein magnetic information (represented by arrows) is exemplarily shown in a width direction of each of magnetic tracks 10.

The magnetic recording medium 1 of a discrete track type in the present invention forms a disc shape on which the magnetic tracks (synonymous with so-called magnetic layers) 10 for writing and reading magnetic information are arranged/formed substantially concentrically. Although FIG. 1 does not show the state where the magnetic tracks 10 are formed on the medium 1, FIG. 2 clearly shows the part (corresponding to the portion a in FIG. 1) of the magnetic tracks 10.

In FIG. 2, the part of the concentrically arranged six magnetic tracks 10 is illustrated. Inasmuch as the magnetic tracks 10 are arranged concentrically, each track line is, to be exact, slightly curved. However, for facilitating understanding of the present invention, each track line in the extremely minute area as shown in FIG. 2 is described so as to be approximated to a straight line on the figure.

As shown in FIG. 2, the discrete track type magnetic recording medium 1 of the present invention has discrete portions 30 each for magnetically separating the magnetic tracks 10 from each other which are located adjacent to each other in a radial direction.

The phrase of "the magnetic tracks 10 are arranged substantially concentrically" includes not only the state where the magnetic tracks 10 are arranged concentrically, but also the state where the magnetic tracks 10 are arranged spirally or helically.

In each magnetic track (magnetic layer) 10 of the present invention, assuming that a saturation magnetic field (a magnetic field where magnetization reaches saturation) in a width direction extending in a radial direction from the center of the disc-shaped magnetic recording medium 1 is $H_R$, and a saturation magnetic field (a magnetic field where magnetization reaches saturation) in a circumferential direction perpendicular to the radial direction is $H_C$, a value of ($H_R/H_C$) is set to fall within a range of 0.5 to 0.95, preferably a range of 0.6 to 0.9, and more preferably a range of 0.7 to 0.8. Further, in the present invention, magnetization information is recorded in the width direction (radial direction) of each magnetic track 10 as shown in FIG. 2. A value of $H_R$ can be derived from a magnetization curve (B-H loop) in the radial direction of the magnetic layer forming the magnetic track. Similarly, a value of $H_C$ can be derived from a magnetization curve (B-H loop) in the circumferential direction of the magnetic layer forming the magnetic track. Incidentally, a definition about the saturation magnetic field is, for example, described with illustration on page 70 of "The Japan Institute of Metals; Metal Physical Property Basic Course 12, Magnetization Mechanism/Magnetic Compound/Magnetic Alloy (published by Maruzen Co., Ltd. in 1982)".

If the value of ($H_R/H_C$) exceeds 0.95, there arises a drawback that magnetization is facilitated in the circumferential direction, and therefore, circumferential components of residual magnetization increase to lower the reproduction output. On the other hand, when the value of ($H_R/H_C$) becomes less than 0.5, there arises a drawback that a coercive force in the radial direction increases to make recording difficult. The setting of the value of ($H_R/H_C$) in the foregoing manner is unique setting of a parameter according to the present invention. The magnetic tracks (magnetic layers) that satisfy such a setting value may be formed by, for example, a method (1) of forming shallow grooves in a radial direction of a substrate and orienting an easy axis of magnetization of a magnetic material, or a method (2) of orienting an easy axis of magnetization of a magnetic material by film deposition in a magnetic field using an orientation magnet.

On the foregoing magnetic recording medium 1 of the present invention of the so-called in-plane width direction recording type, the discrete portions 30 for the magnetic separation are formed in gap portions between the radially adjacent magnetic tracks 10, respectively, as described above. In FIG. 2, a relationship between a track pitch ($T_P$) of each magnetic track 10 and a width ($T_W$) thereof satisfies $0.8 \geq (T_W/T_P) \geq 0.4$, preferably $0.8 \geq (T_W/T_P) \geq 0.5$.

If a value of ($T_W/T_P$) exceeds 0.8, there arises possibility that the magnetic tracks adjacent to the magnetic track subjected to recording are overwritten due to a fringe magnetic field of the magnetic head 70. On the other hand, when the value of ($T_W/T_P$) becomes less than 0.4, the reproduction output tends to be lowered, and there arises possibility that the error rate is degraded. The track width ($T_W$) is set to about 15 to 400 nm.

By satisfying the setting conditions of the value of ($T_W/T_P$) and the value of ($H_R/H_C$), the in-plane width direction recording of the present invention is carried out quite excellently.

Figure 3A:
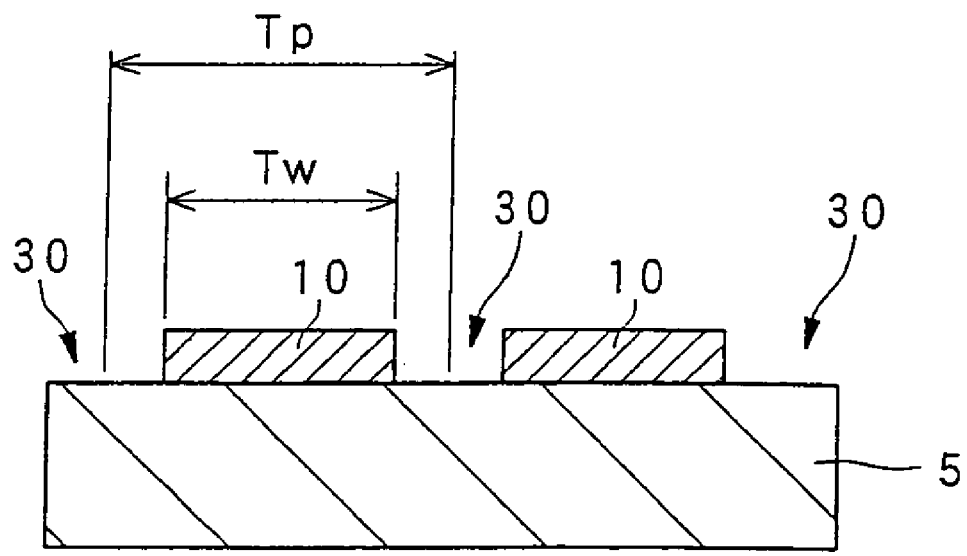
FIG. 3A is an exemplary sectional view of a magnetic recording medium of a preferred embodiment, which has a relatively simple structure for facilitating understanding of the present invention, and substantially corresponds to a sectional view taken along line (β)—(β) in FIG. 2.
Figure 3B:
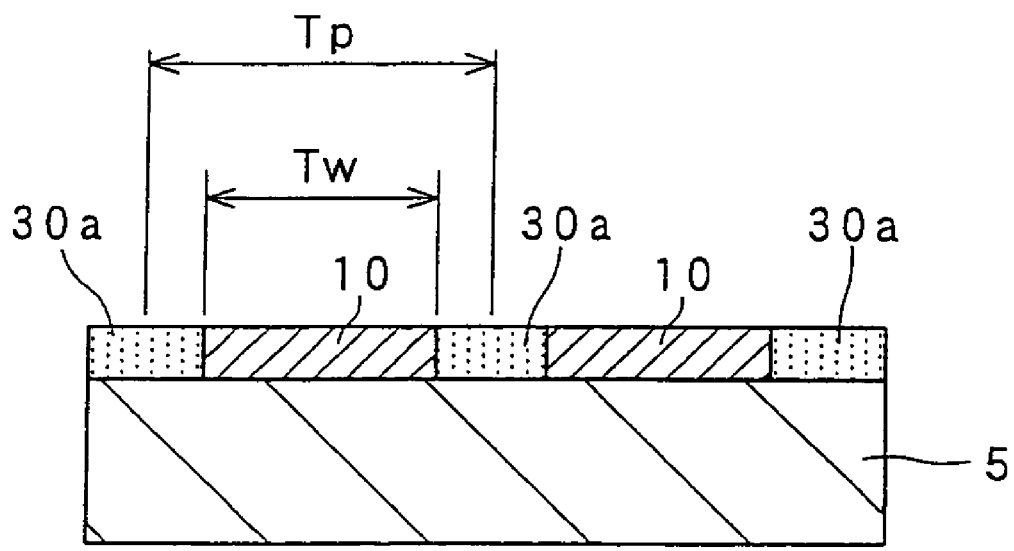
FIG. 3B is an exemplary sectional view showing a preferred modification of the magnetic recording medium shown in FIG. 3A.

FIG. 3A is an exemplary sectional view of the magnetic recording medium of the preferred embodiment, which has a relatively simple structure for facilitating understanding of the present invention, and substantially corresponds to a sectional view taken along line (β)—(β) in FIG. 2. FIG. 3B shows a preferred modification of the magnetic recording medium shown in FIG. 3A.

In the preferred embodiment shown in FIG. 3A, the magnetic recording medium 1 comprises a nonmagnetic substrate 5 and the magnetic tracks (magnetic layers) 10 formed on the nonmagnetic substrate 5 and each having the track width $T_W$. At portions located between the adjacent magnetic tracks 10 are formed vacant recesses (discrete portions) 30 for magnetically separating the adjacent data tracks to provide a discrete function. In FIG. 3A, symbol $T_P$ represents the pitch of the magnetic tracks 10.

The nonmagnetic substrate 5 may be made of a material that is normally used for the magnetic recording medium of this type, such as aluminum, tempered glass, crystallized glass, or carbon plastics.

The magnetic layer 10 may be made of any material that is normally used for the in-plane recording magnetic layer, such as a CoCr alloy, a CoCrPt alloy, a CoCrTa alloy, a CoNi alloy, or a CoPt alloy. The thickness of the magnetic layer 10 may be suitably selected while taking into account a head to be used, recording wavelengths to be used, and so forth. Particularly, inasmuch as magnetization information is recorded in the magnetic track width direction on the magnetic recording medium of the present invention, there are no demagnetization fields between recording bits, and therefore, the thickness of the magnetic layer can be increased as compared with the conventional longitudinal direction recording, so that it is possible to improve a problem of loss of the magnetization information caused by thermal fluctuation. In the present invention, the phrase of "magnetization information is recorded in the magnetic track width direction" is synonymous with "a direction of recorded magnetization is along the magnetic track width direction".

The thickness of the magnetic layer 10 is set to about 5 to 100 nm. Within this range, it is possible to use particularly a range of extremely large film thickness of 50 to 100 nm. Further, the magnetic recording medium of the present invention, while being of the in-plane recording type, causes no self-demagnetization even in high linear recording density, and therefore, it is not necessary to greatly enhance a coercivity of the medium, so that designing of the recording head is facilitated. The coercivity of the magnetic layer 10 is 300 to 4000 Oe and, in the present invention, it is possible to use the medium even in a range of 300 to 1000 Oe, which is not used in the normal in-plane recording.

The high linear recording density in the magnetic recording medium of the present invention is targeted for 50 Gbit/in² or more, particularly a range of 200 to 1000 Gbit/in².

The magnetic layers 10 may be formed by sputtering, vacuum deposition, plating, or the like.

On the magnetic layers 10, one of various known protective films or lubricating films containing an organic lubricant may be formed for the purpose of protecting the magnetic layers.

The structure of a magnetic recording medium shown in FIG. 3B is a modification of the structure shown in FIG. 3A. The medium shown in FIG. 3B differs from the medium shown in FIG. 3A in that a nonmagnetic material 30a is filled in each vacant recess 30. The filled nonmagnetic material 30a serves to provide the substantially same function as the discrete portion 30 of FIG. 3A. As the nonmagnetic material 30a filled in the vacant recess 30, $SiO_2$, $Al_2O_3$ or C(carbon), for example, is preferably used.

Comparing the mediums of FIGS. 3A and 3B in terms of reliability of recording and reproduction, the structure of FIG. 3B has a merit over that of FIG. 3A in that inasmuch as there are no steps in the head advancing direction in the structure of FIG. 3B, a flying operation of the head is stabilized.

On the magnetic recording medium of the present invention, a dedicated pattern generally called a servo pattern may also be formed other than the magnetic tracks (so-called data tracks) for recording and reproducing the magnetic information. This dedicated pattern may be, for example, a predetermined pattern group offset by a half track pitch relative to the data tracks for the purpose of tracking, or track addresses.

As described above, the magnetic recording medium 1 of the present invention is configured such that the magnetization information is recorded in the width direction of each magnetic track 10 as shown in FIG. 2. Hereinbelow, description will be given about the magnetic recording and reproducing system for embodying it.

The magnetic recording and reproducing system comprises the foregoing magnetic recording medium 1 and the magnetic recording device that is used with the medium 1 incorporated therein. The magnetic recording device comprises the magnetic head 70 for recording (writing) and reproducing (reading) magnetic information relative to the foregoing disc-shaped magnetic recording medium 1, an arm 75 that is swung, while retaining the magnetic head 70, to thereby move the magnetic head 70 to a predetermined radial position of the magnetic recording medium 1, and a controller for controlling operation of the arm 75. The magnetic head 70 is fixed to a slider 73.

In the magnetic recording and reproducing system of the present invention, the structure of the magnetic head 70 and a positional relationship between the magnetic head 70 and the magnetic recording medium 1 are particularly important.

Figure 4:
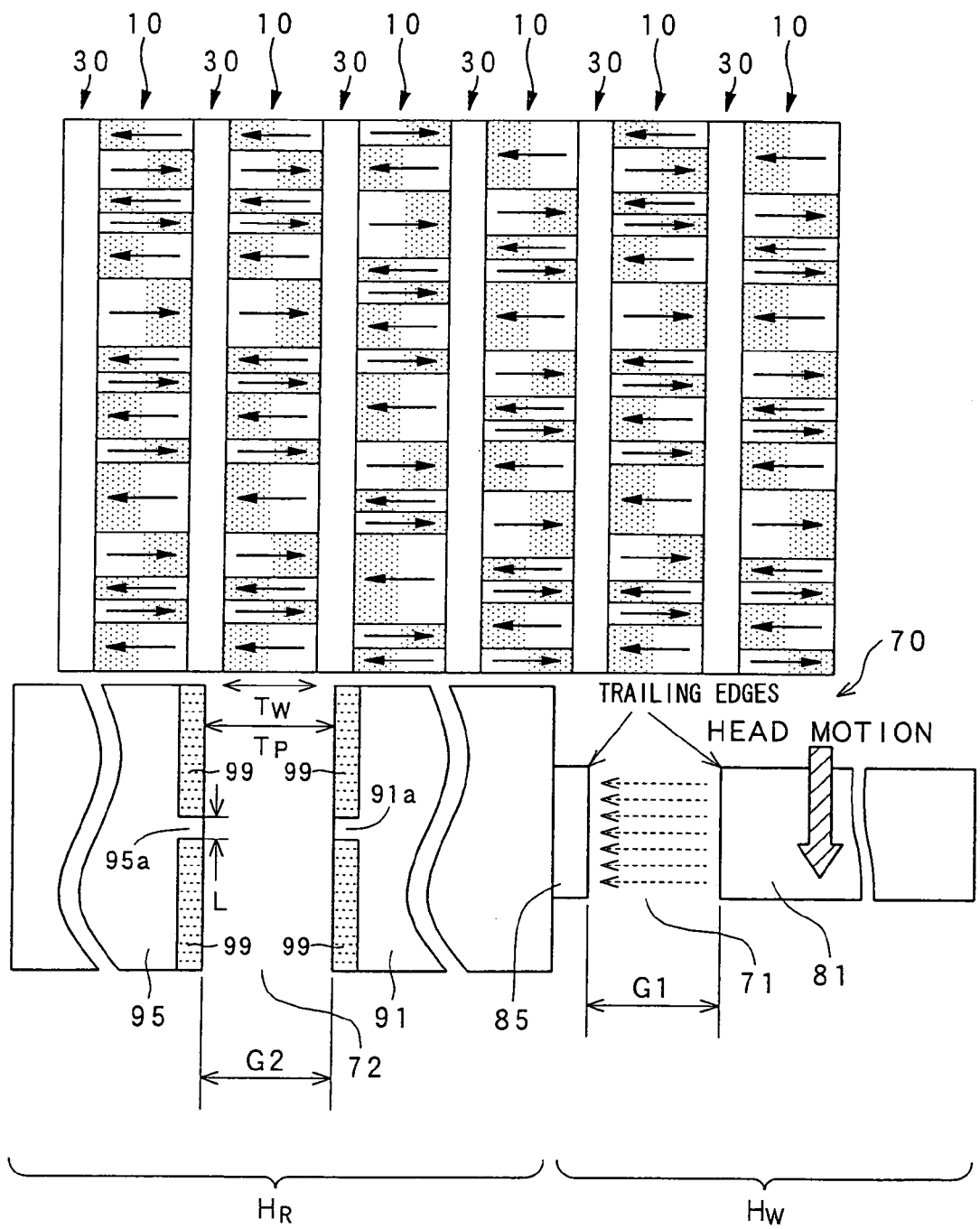
FIG. 4 is a diagram showing the magnetic recording medium as shown in FIG. 2 and an ABS(Air Bearing Surface) of the magnetic head (a magnetic head end surface confronting the magnetic recording medium) that records and reproduces magnetic information relative to the magnetic recording medium, for facilitating understanding of a relationship between the magnetic recording medium and the magnetic head.

For facilitating understanding of the relationship between the magnetic recording medium 1 and the magnetic head 70, FIG. 4 shows an ABS(Air Bearing Surface) of the magnetic head 70 (a magnetic head end surface confronting the magnetic recording medium 1) that records and reproduces the magnetic information relative to the magnetic recording medium 1, in addition to the magnetic recording medium 1 as shown in FIG. 2.

In FIG. 4, the magnetic head 70 comprises a recording head portion $H_W$ having a recording gap 71 for recording magnetization information in the width direction of the magnetic track 10, and a reproducing head portion $H_R$ having a reproducing gap 72 for taking in (reproducing) magnetization information recorded in the width direction of the magnetic track 10 (so-called merged magnetic head). These recording gap 71 and reproducing gap 72 are arranged so as to span the width of the magnetic tracks, respectively.

In the present invention, it is desirable that a relationship between the length of the recording gap 71 (recording gap length: G1) of the magnetic head and the track width ($T_W$) of the magnetic recording medium 1 satisfy $1.5 \geq (G1/T_W) \geq 0.9$, preferably $1.2 \geq (G1/T_W) \geq 0.95$. When a value of ($G1/T_W$) exceeds 1.5, there arises possibility that the adjacent magnetic tracks are overwritten due to a fringe magnetic field of the magnetic head upon recording. On the other hand, when the value of (G1/$T_W$) becomes less than 0.9, there arises a tendency that a so-called overwrite characteristic is degraded.

Further, in the present invention, it is desirable that a relationship between the length of the reproducing gap 72 (reproducing gap length: G2) of the magnetic head and the track width ($T_W$) of the magnetic recording medium 1 satisfy 1.2≧(G2/$T_W$)≧0.75, preferably 1.1≧(G2/$T_W$)≧0.9. When a value of (G2/$T_W$) exceeds 1.2, there arises possibility that influence to a magnetic field from the adjacent magnetic tracks is generated to degrade the error rate. On the other hand, when the value of (G2/$T_W$) becomes less than 0.75, there arises a tendency that the reproduction output is lowered to degrade the error rate.

Description will be further given about the recording head portion $H_W$ having the recording gap 71 for recording the magnetization information in the width direction of the magnetic track 10. In FIG. 4, a relative motion direction between the magnetic head 70 and the magnetic recording medium 1 is a direction identified by an arrow as HEAD MOTION. Core members 81 and 85 defining the recording gap 71 are made of a high magnetic permeability material. The core members 81 and 85 extend upward from the drawing sheet surface of FIG. 4 and form a closed magnetic path. Substantial recording of magnetic information is carried out at trailing edge portions.

Subsequently, description will be given about the reproducing head portion $H_R$ having the reproducing gap 72 for taking in (reproducing) the magnetization information recorded in the width direction of the magnetic track. The reproducing gap 72 is defined by core members 91 and 95, particularly by magnetic information inlet ports 91a and 95a narrowed down by a nonmagnetic material 99. A length L of each of the inlet ports 91a and 95a is set to about the shortest bit length. The core members 91 and 95 are made of a high magnetic permeability material. The core members 91 and 95 extend upward from the drawing sheet surface of FIG. 4 and form a closed magnetic path. It is desirable that a magnetoresistance effect element (not shown) for reading magnetic information be interposed in the closed magnetic path.

The magnetoresistance effect element may be any one of an AMR (anisotropic magnetoresistance effect) element, a GMR (giant magnetoresistance effect) element, a TMR (tunnel junction magnetoresistance effect) element, a GMR element of CPP (current perpendicular to plane) type, and the like, all of which are known.

The merged magnetic head shown in FIG. 4 is configured such that the recording gap 71 and the reproducing gap 72 are spaced part from each other by a distance corresponding to several tracks.

Hereinbelow, the present invention will be described in further detail by showing concrete examples.

EXAMPLE

A magnetic recording medium and a magnetic head having structures shown below were respectively prepared, and actual recording and reproducing operations thereof were confirmed.

(1) Structure of Magnetic Recording Medium

| | |
|---|---|
| Size of Nonmagnetic Substrate: | φ65 mm |
| Material of Nonmagnetic Substrate: | Tempered Glass |

-continued

| | |
|---|---|
| Material of Magnetic Layer: | CoCrTa Alloy ($H_C$ = 2000Oe) |
| Thickness of Magnetic Layer: | 40 nm |
| $H_R/H_C$ = 0.8 | |
| Track Pitch ($T_P$): | 150 nm |
| Width of Magnetic Track ($T_W$): | 120 nm |
| Material of Discrete Portion: | $SiO_2$ |

(2) Structure of Magnetic Head (Merged Head as Shown in FIG. 4)

Recording Head Portion $H_W$
   Structure and Material of Recording Head Portion: A basic closed magnetic path was formed of NiFe being a high magnetic permeability material.
   Recording Gap Length G1: 140 nm Reproducing Head Portion $H_R$
   Structure and Material of Reproducing Head Portion: A basic closed magnetic path was formed of NiFe being a high magnetic permeability material, and a spin valve GMR element was interposed in the closed magnetic path.
   Reproducing Gap Length G2: 130 nm
   Length L of Magnetic Field Inlet Port: 20 nm; about the shortest bit length Using the magnetic recording medium and the magnetic head thus prepared, the actual recording and reproducing operations were tested. As a result, it was confirmed that magnetization information was recorded in the magnetic track width direction, and the recorded magnetization information was securely reproduced.

Further, experiments were similarly conducted by changing a value of $H_R/H_C$. As a result, it was confirmed that excellent recording was achieved in the range of $H_R/H_C$=0.5 to 0.95.

Further, it was confirmed that excellent recording and reproducing characteristics were achieved when a relationship between the track pitch ($T_P$) of the magnetic track and the width ($T_W$) thereof satisfies 0.8≧($T_W/T_P$)≧0.4, further a relationship between the recording gap length (G1) of the magnetic head and the track width ($T_W$) of the magnetic recording medium satisfies 1.5≧(G1/$T_W$)≧0.9, and further a relationship between the reproducing gap length (G2) of the magnetic head and the track width ($T_W$) of the magnetic recording medium satisfies 1.2≧(G2/$T_W$)≧0.75. It was further confirmed that a high recording density of 200 Gbit/in$^2$, which was unable to be realized in the conventional in-plane track direction recording, was realized.

The effects of the present invention are clear from the foregoing results. Specifically, according to the foregoing structure of the present invention, the recording and reproduction in the magnetic track width direction, which has been quite difficult to be realized, can be realized.

Owing to the realization of such recording and reproduction in the magnetic track width direction, the excellent effects can be accomplished, such as (1) it is not necessary to greatly enhance the coercivity of the medium, so that designing of the recording head is facilitated, (2) the thickness of the magnetic layer can be increased as compared with the conventional longitudinal direction recording, so that it is possible to improve the problem of loss of the magnetization information caused by thermal fluctuation, and (3) the gap length of the magnetic head is about the magnetic track width of the medium, so that designing of the magnetic head is facilitated.

What is claimed is:

1. A disc-shaped magnetic recording medium on which magnetic tracks for writing and reading magnetic information are arranged substantially concentrically, wherein, a saturation magnetic field in a width direction extending in a radial direction from the center of the disc-shaped magnetic recording medium is $H_R$, and a saturation magnetic field in a circumferential direction perpendicular to said radial direction is $H_C$, $H_R/H_C$ is set to a value within a range of 0.5 to 0.95 in each of said magnetic tracks, and magnetization information is recorded in the width direction of each magnetic track, and wherein, in gap portions between the magnetic tracks located adjacent to each other in said radial direction, discrete portions for magnetically separating the adjacent magnetic tracks are formed, respectively.

2. The magnetic recording medium according to claim 1, wherein a relationship between a track pitch ($T_P$) of each magnetic track and a width ($T_W$) thereof satisfies $0.8 \geq (T_W/T_P) \geq 0.4$.

3. The magnetic recording medium according to claim 1, wherein a relationship between a track pitch ($T_P$) of each magnetic track and a width ($T_W$) thereof satisfies $0.8 \geq (T_W/T_P) \geq 0.5$.

4. The magnetic recording medium according to claim 1, wherein the value of $H_R/H_C$ falls within a range of 0.6 to 0.9.

5. The magnetic recording medium according to claim 1, wherein the value of $H_R/H_C$ falls within a range of 0.7 to 0.8.

6. The magnetic recording medium according to claim 1, wherein a thickness of a magnetic layer of each magnetic track falls within a range of 5 to 100nm.

7. The magnetic recording medium according to claim 1, wherein a thickness of a magnetic layer of each magnetic track falls within a range of 50 to 100nm.

8. The magnetic recording medium according to claim 1, wherein a coercivity of a magnetic layer of each magnetic track falls within a range of 300 to 4000 Oe.

9. The magnetic recording medium according to claim 1, wherein a coercivity of a magnetic layer of each magnetic track falls within a range of 300 to 1000 Oe.

10. A magnetic recording and reproducing system comprising a magnetic recording medium, and a magnetic head for writing or reading information relative to said magnetic recording medium, wherein said magnetic recording medium is a disc-shaped magnetic recording medium on which magnetic tracks for writing and reading magnetic information are arranged substantially concentrically, wherein, a saturation magnetic field in a width direction extending in a radial direction from the center of the disc-shaped magnetic recording medium is $H_R$, and a saturation magnetic field in a circumferential direction perpendicular to said radial direction is $H_C$, $H_R/H_C$ is set to a value within a range of 0.5 to 0.95 in each of said magnetic tracks, and magnetization information is recorded in the width direction of each magnetic track, wherein, in gap portions between the magnetic tracks located adjacent to each other in said radial direction, discrete portions for magnetically separating the adjacent magnetic tracks are formed, respectively, wherein said magnetic head comprises a recording head portion having a recording gap for recording the magnetization information in the width direction of the magnetic track, and a reproducing head portion having a reproducing gap for taking in the magnetization information recorded in the width direction of the magnetic track, wherein a relationship between a length (G1) of the recording gap of said magnetic head and a track width ($T_W$) of said magnetic recording medium satisfies $1.5 \geq (G1/T_W) \geq 0.9$, and wherein a relationship between a length (G2) of the reproducing gap of said magnetic head and the track width ($T_W$) of said magnetic recording medium satisfies $1.2 \geq (G2/T_W) \geq 0.75$.

11. The magnetic recording and reproducing system according to claim 10, wherein a relationship between a track pitch ($T_P$) of each magnetic track and the track width ($T_W$) thereof satisfies $0.8(T_W/T_P) \geq 0.4$.

12. The magnetic recording and reproducing system according to claim 10, wherein a relationship between a track pitch ($T_P$) of each magnetic track and the track width ($T_W$) thereof satisfies $0.8(T_W/T_P) \geq 0.5$.

13. The magnetic recording and reproducing system according to claim 10, wherein the relationship between the length (G1) of the recording gap of said magnetic head and the track width ($T_W$) of said magnetic recording medium satisfies $1.2 \geq (G1/T_W) \geq 0.95$.

14. The magnetic recording and reproducing system according to claim 10, wherein the relationship between the length (G2) of the reproducing gap of said magnetic head and the track width ($T_W$) of said magnetic recording medium satisfies $1.1 \geq (G2/T_W) \geq 0.9$.

15. The magnetic recording and reproducing system according to claim 10, wherein the value of $H_R/H_C$ falls within a range of 0.6 to 0.9.

16. The magnetic recording and reproducing system according to claim 10, wherein the value of $H_R/H_C$ falls within a range of 0.7 to 0.8.

17. The magnetic recording and reproducing system according to claim 10, wherein a thickness of a magnetic layer of each magnetic track falls within a range of 5 to 100 nm.

18. The magnetic recording and reproducing system according to claim 10, wherein a thickness of a magnetic layer of each magnetic track falls within a range of 50 to 100 nm.

19. The magnetic recording and reproducing system according to claim 10, wherein a coercivity of a magnetic layer of each magnetic track falls within a range of 300 to 4000 Oe.

20. The magnetic recording and reproducing system according to claim 10, wherein a coercivity of a magnetic layer of each magnetic track falls within a range of 300 to 1000 Oe.

* * * * *